Feb. 19, 1957 A. G. THOMAS 2,782,354
MOTOR
Filed Jan. 28, 1954 5 Sheets-Sheet 1

Fig.1

Albert G. Thomas INVENTOR

Feb. 19, 1957 A. G. THOMAS 2,782,354
MOTOR
Filed Jan. 28, 1954 5 Sheets-Sheet 2

Fig. 2

Albert G. Thomas
INVENTOR

Feb. 19, 1957 A. G. THOMAS 2,782,354
MOTOR

Filed Jan. 28, 1954 5 Sheets-Sheet 3

Fig. 3

*Albert G. Thomas* INVENTOR

Feb. 19, 1957 A. G. THOMAS 2,782,354
MOTOR
Filed Jan. 28, 1954 5 Sheets-Sheet 4

Albert G. Thomas
INVENTOR

Feb. 19, 1957     A. G. THOMAS     2,782,354
MOTOR Filed Jan. 28, 1954     5 Sheets-Sheet 5

Fig. 6.

Albert G. Thomas

INVENTOR

# United States Patent Office 2,782,354
Patented Feb. 19, 1957

2,782,354
MOTOR
Albert G. Thomas, Chattanooga, Tenn.
Application January 28, 1954, Serial No. 406,740
7 Claims. (Cl. 318—254)

This invention relates to motors and especially to step motors designed to rotate in predetermined steps or through definite displacements. This application is a continuation-in-part of my co-pending applications, Serial No. 295,694 filed June 20, 1952, and Serial No. 373,187, filed August 10, 1953.

In many industrial, military, and other applications it is frequently desired to move objects through definite displacements or to rotate shafts through definite angles, in either forward or reverse direction. Typical illustrations are in synchronized pointing of guns, control of guided missiles, telemetering, automatic control of milling machines and other machine tools from information on a tape or other record, operation of valves or other control devices at a distance, and various other uses. Outstanding advantages of this motor are that it can respond step by step to phased currents applied to its windings; it does not run away as other types of synchronous motors sometimes do; it does not over-travel, but can be megnetically locked in position when stopped; and it can be quickly accelerated or reversed. It also has high torque at low speed.

An object of this invention is to provide a step motor of the general type described in my prior patent applications, but which can be operated at faster speeds.

Another object is to provide a motor with a power booster which can be used to improve acceleration and operating speed of the motor.

A further object is to provide a motor which will produce relatively great power for its size.

An additional object is the provision of an improved brake to prevent rotor oscillations.

Another object is to provide a step motor with means for automatically applying a relatively heavy starting current at the beginning of each step rotor movement and for automatically reducing the current for the remainder of the step movement.

Other objects will appear in the following description.

Figure 1:
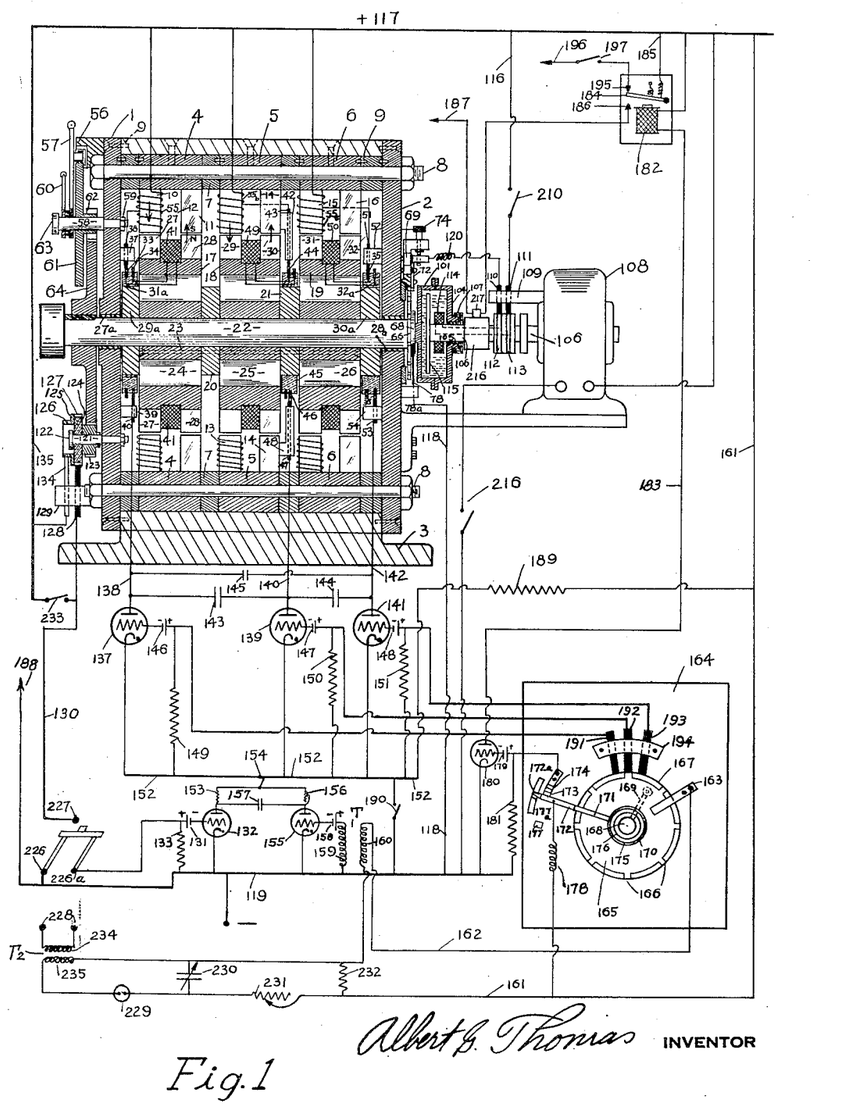
Figure 1 is a part sectional front elevation of my improved step motor and associated control mechanism.

In Figure 1, the motor has end plates 1 and 2 screwed to base 3 and stator field rings 4, 5, and 6 are separated from the end plates and from each other by collars 7. Bolts 8 are passed through bores in the field rings and collars and clamp them tightly together by means of suitable threaded nuts. Dowel pins 9 may be inserted between the collars and rings to prevent circumferential shift. Each field ring has two rows of radial teeth like 10 and 11 of the first section, the inner tips of which are of equal circumferential width and are equally spaced. The circumferential width of these teeth or poles are preferably equal to the circular widths of air gaps between them. The stator rings and integral poles or teeth may be cast of a suitable magnetic metal like mild steel, or they can be assembled from laminations or powdered iron or steel. It is preferable that the magnetic flux does not have to cross lamination interfaces. The two circular rows of teeth 10 and 11 of the first phase are separated by air space 12.

Likewise, poles 13 and 14 are integral with ring 5 of the second phase and are constructed and spaced similarly to poles 10 and 11. Poles 15 and 16, integral with ring 6 of the third phase, are constructed and spaced in like manner to that described. The teeth or poles of the three phases are preferably in line, looking at the motor endwise, but this is not essential. The teeth 11, 14, and 16 may be offset from teeth 10, 13, and 15, to provide more space for windings, or for other reasons.

The rotor is made of three sections or phases comprising cylindrical cores 17, 18, and 19, spaced by collars 20 and 21 which are fastened to shaft 22 by set screws. Suitable through bolts 23 clamp the rotor sections and collars 20 and 21 tightly together into a unitary structure. Holes 24, 25, and 26 are cast or bored in the rotor to make it relatively light in weight. Rotor section 17 has radial teeth or poles 27 and 28 angularly and axially spaced to bring the tips of these teeth into register with the tips of the teeth 10 and 11. The circumferential width of the rotor teeth for all three phases is likewise equal to the spacing between the teeth. Assuming that rotor teeth 27 and 28 are in register with associated stator teeth 10 and 11, respectively, the rotor teeth 29 and 30 are positioned so that they overlap the respective stator teeth 13 and 14 by ⅓ tooth width. Likewise, when rotor teeth 29 and 30 are in register with associated stator teeth 13 and 14, the rotor teeth 31 and 32 of the third phase overlap the associated stator teeth 15 and 16 by ⅓ tooth width.

The rotor sections or phases can be made of cast mild steel or may be fabricated of laminations or of powdered iron. The air gap between the stator and rotor is preferably small, on the order of 0.005 inch or less. The shaft 22 is rotatable in bearings 27a and 28a fastened in respective end plates 1 and 2. These bearings can be of the ball or roller type, if desired. Spacing collars 29a and 30a are fastened to shaft 22 by set screws and carry attached annular rings 31a and 32a, respectively, of insulating material such as Bakelite or the like. Brass or other slip rings 33 and 34 are fastened in insulating element 31a, and similar slip rings 35 and 36 are fastened in insulating element 32. Slotted insulating block 37 is fastened to the inner face of plate 1 and has spring-pressed brush 38 slidable in a slot and in contact with slip ring 33. Similar block 39 is fastened to plate 1 and carries brush 40 in contact with slip ring 34. Slip rings 33 and 34 are electrically connected with the ends of toroidal magnetizing winding 41 wound around rotor element 17 and situated in the space between teeth 27 and 28.

Insulating block 42 is likewise slotted to hold spring-pressed brush 43 and is screwed or otherwise fastened to teeth 14, although it can be fastened to any fixed part of the motor. This brush is in contact with slip ring 44 which is rotated by attached ring 45 of suitable insulating material. This ring is pressed on or screwed to collar or spacer 21 and rotates therewith. Slip ring 46 is also carried by insulating ring 45, and brush 47, slidably held in a slot in insulating block 48, is in contact with slip ring 46. Block 48 is attached to some of the teeth 14, or otherwise. Toroidal magnetizing winding 49 is placed around rotor element 18 and has its ends connected to slip rings 44 and 46. Similar magnetizing winding 50 is wound around rotor element 19, with the winding ends connected to slip rings 35 and 36. Brush 51 is slidable in insulating block 52 attached to plate 2 and is in contact with slip ring 35. Similarly, brush 53 is slidable in insulating block 54 attached to plate 2. This brush is in contact with slip ring 36.

The poles or teeth 10 are wound with suitable insulated wire, forming a plurality of connected windings 55 which, when energized, cause all the teeth 10 to be magnetized with, say, North poles at the tips. Therefore, the tips of adjacent rotor poles 27 will have induced South poles, and the tips of teeth or poles 28 will have North poles, causing induced South poles in the tips of adjacent stator teeth 11. The magnetic flux paths are indicated by the arrows. Rotor winding 41 is connected in circuit with stator winding 55, in series, parallel, or series parallel, as desired. The polarity of winding 41 is arranged, however, to aid the magnetizing effect of winding 55. Winding 55 is connected to winding 41 through brushes 38 and 40 and associated slip rings 33 and 34. This spool-like rotor winding produces a powerful magnetizing force and relatively short magnetic path and, in conjunction with the stator windings, furnishes strong magnetization of the poles with moderate magnetizing currents.

The second and third phases are similarly wound, field winding 55b of the second section or phase being electrically connected with rotor winding 49 through brushes 43 and 47 and associated slip rings. As before, the magnetizing effects of the two windings are arranged to add. Similarly, stator winding 55c of the third section or phase is electrically connected with rotor winding 50 by means of brushes 51 and 53 and associated slip rings. Again, the magnetizing effects of the two windings add. If desired, shaft 22 may comprise a tube, and the connections for the rotor windings may be brought through the shaft to slip rings placed on the shaft outside the casing.

Figure 2:
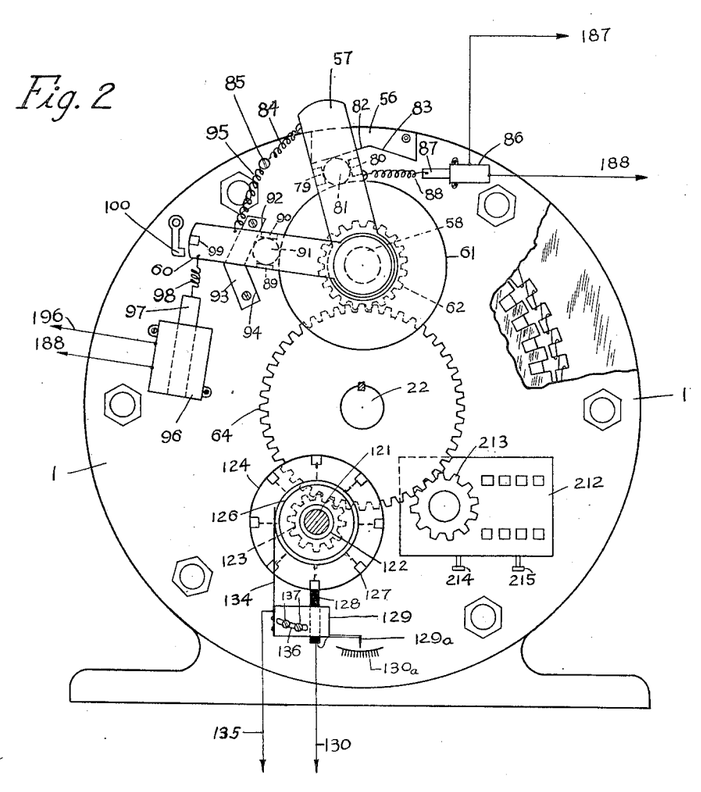
Figure 2 is a left end view of the motor shown in Figure 1.

Cam element 56, having inclined working surfaces arranged in an inverted V, is bolted to plate 1 as shown in Figure 2, and in Figure 1. Arm 57 is pivoted on stub shaft 58, a reduced end of which passes through a hole in plate 1 and is held by nut 59. Similar arm 60 is also pivoted on this shaft which rotatably supports hardened metal disc 61 and concentric-attached pinion 62. Shaft 58 has flange-like head 63 to hold the arms and disc in axial position. Gear 64, of considerably larger diameter than the pinion, is keyed to principal shaft 22 and is meshed with pinion 62.

Commutator 65 (Figure 3) comprises a disc, with hub, of Bakelite or other insulating material, with preferably rectangular copper or other metal bars 66 molded in or inserted in slots or holes in the commutator disc. These bars are electrically connected with metal slip ring 68 fastened over the insulating hub of the commutator. There are the same number of equally spaced bars 66 as there are steps in the motor. This number will be three times the number of poles 10. If desired, the number of commutator bars can be reduced and the commutator can be driven by an attached pinion in mesh with gear 64. Proper relationship between the number of steps, bars, and gear ratio should be maintained. The insulating central portion of the commutator is fastened to shaft 22 by means of set screws or by keying.

Figure 3:
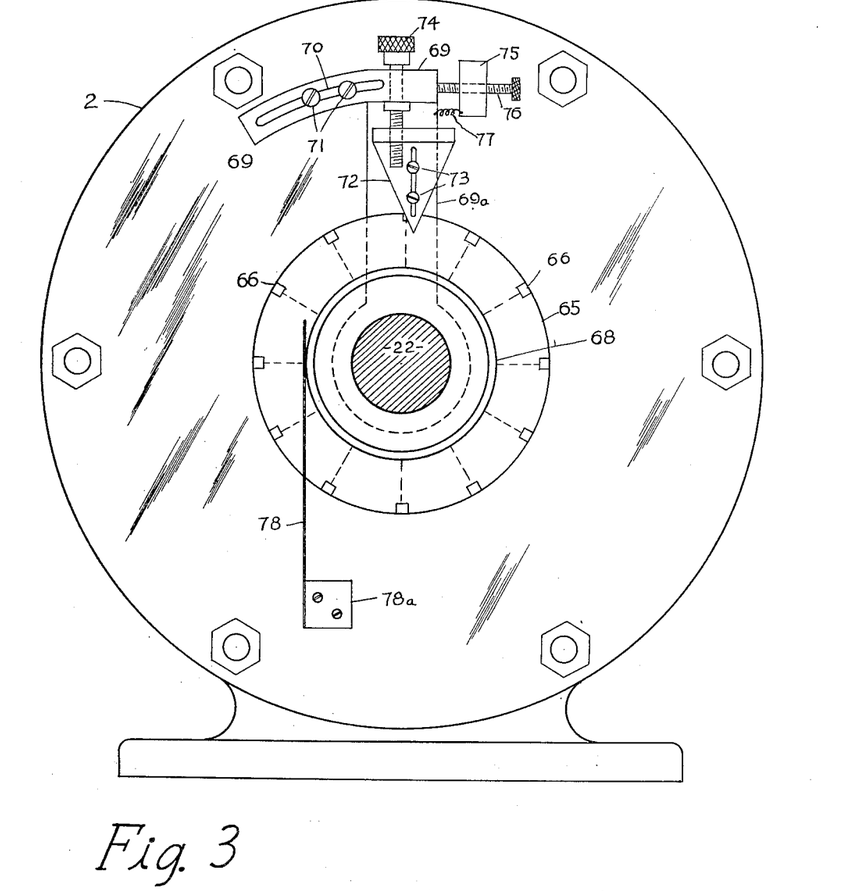
Figure 3 is an end view of the motor, looking from the right in Figure 1, and showing details of a commutator.

Member 69 is made of Bakelite or other insulating material and has a curvature concentric with shaft 22. This number has slot 70, also concentric with shaft 22 and is guided by screws 71 threaded into holes in plate 2. Arm 69a is integral with member 69 and supports, by means of attached screws 73, slotted triangular metal or other conductive brush 72 for sliding action toward or away from the axis of shaft 22. Knurled button 74 has an integral reduced shank rotatable in a bore in member 69, being held in place by a shoulder and collar attached to the shank which, beyond the collar, is threaded and is screwed into a threaded hole in brush 72. This brush is arranged to rub against the adjacent face of the commutator so that the ends of the rotating commutator bars 66 will make contact with the brush for periods of time increasing as the brush is moved toward shaft 22 by turning button 74. Similarly, moving the brush in opposite direction will reduce the contact period. Springs between screw heads 73 and the brush may be used to urge brush 72 against the ends of the bars.

Boss 75 is integral with plate 2 and has a threaded hole in which threaded rod 76, having a knurled head, is screwed. The end of this rod serves as a stop for the contiguous end of element 69 which is pulled against this stop by tension spring 77 fastened to element 69 and to boss 75. Therefore, the brush 72 may be shifted along circular paths concentric with the axis of shaft 22. The length of time during which the brush is in contact with a commutator bar is adjustable by turning button 74, since the tapered brush is moved toward or away from shaft 22. The phase relationship of the time of contact of a commutator bar with the brush is determined by adjusting screw 76 so that the brush contacts are made at definite relative positions of the rotor poles with respect to the associated stator poles, regardless of which phase or section of the motor is energized.

Resilient metal strip or other brush 78 is attached to insulating block 78a fastened to plate 2 and rubs against slip ring 68 which is electrically connected with commutator bars 66, but which is insulated from shaft 22.

Circular steel or iron housing element 101 has good magnetic permeability and is attached to shaft 22 in leak-proof manner by means of a hub and suitable packing. This pan-like housing element has a flange, against which a similar flange of cooperating housing member 104 is forced by screws, a suitable gasket being between the flanges. Element 104 is also made of good magnetic material and has concentric bearing 105 which is rotatable on shaft 106. Packing gland 107 is provided to prevent leakage. Shaft 106 is the shaft of motor 108 which may be of any suitable type such as shunt or synchronous, for example. Bakelite or other insulating block 109 is attached to motor 108 and carries brushes 110 and 111 which are slidable in slots in block 109. Brush 110 is pressed against slip ring 112 by a spring, and brush 111 is pressed against slip ring 113. These slip rings are mounted on an insulating collar on shaft 106 and are electrically connected with the ends of toroidal winding 114 placed around shaft 106 adjacent to attached, concentric magnetizable steel or iron disc 115. This winding is suitably sealed to prevent leakage of liquid to the wires. Shaft 106 has an axial bore, through which conductors connecting the winding with the slip rings are passed. Packing may be used to protect the bearing from particles in the housing.

A mixture of iron particles and oil, iron particles and graphite, or the like, is contained in housing 101—104, and occupies space between disc 115 and housing 101. Normally, there is little driving action between disc 115 and housing 101, but when winding 114 is energized, a magnetic flux is developed between the disc and housing, and the disc then is effectively tightly bound to disc 101 and attached shaft 22. When the winding 114 is de-energized, the driving action is largely eliminated quickly. Current is supplied to winding 114 through conductor 116, connecting brush 111 and positive line 117 through switch 210, and by conductor 118 connected to negative line 119 and to brush 78 of slip ring 68 which leads to commutator contacts 66 which in turn periodically make connection with brush 72. The remainder of the circuit to winding 114 is made through flexible wire 120 connected to brush 72 and to brush 110.

While this type of clutch is shown, other suitable types of clutches could be used. The purpose of the clutch is to allow the spinning motor 108 to give shaft 22 a quick boost at the beginning of each step movement of the step rotor assembly in order to increase possible speed and load of the step motor. It is important that the power from booster motor 108 be disconnected before the end of each step movement in order to prevent over-travel. Motor 108 is connected to suitable power lines which may be lines 117 and 119. A suitable control switch 216 is provided.

Arm 57 has inwardly projecting lugs 79 and 80, preferably with plane faces which limit circular displacement of hardened roller 81, but which do not limit movement of this roller in radial direction with respect to shaft 58. This roller is adapted to wedge between hardened surface 82 of element 56 and disc 61 when arm 57 is pulled counter-clockwise (Figure 2) by tension spring 84 attached to the arm and to pin or stud 85 projecting from plate 1. This pinching action tightly locks disc 61 against any appreciable movement about shaft 58 in counter-clockwise direction, but allows this disc to rotate freely in opposite direction. Pinion 62 and gear 64 are tightly meshed so that there will be little, if any, back-lash. Therefore, when disc 61 is locked against rotation in one direction, gear 64 and attached rotor shaft 22 are locked against rotation in opposite direction.

Solenoid 86 is fastened to plate 1, and its plunger 87 is attached to arm 57 through spring 88 which is considerably stiffer than spring 84. Therefore, when the solenoid is energized, the plunger is pulled into the solenoid, and arm 57 is rotated clockwise against the tension of spring 84 until roller 81 is wedged between hardened surface 83 of brake element 56 and disc 61, thereby prohibiting any appreciable rotation of disc 61 in clockwise direction, but allowing free rotation of this disc in opposite direction. This, of course, locks the rotor against counter-clockwise rotation, but allows free rotor movement in opposite direction. The surfaces 82 and 83 are symmetrically placed with respect to disc 61. I have found that an angle of 6° between either surface and tangents to disc 61, drawn at points of contact of the roller with disc 61, in locking position, will provide good locking action and easy release. The invention is not limited to this angle, however.

Arm 60 is similar to arm 57 and is pivotally supported on shaft 58. This arm has attached lugs 89 and 90, similar to lugs 79 and 80, and which serve to shift roller 91 against hardened cam surface 92 of brake block 93 or against hardened cam surface 94 of this block, depending upon the direction of movement of arm 60. Block 93 is similar to element 56 and is bolted or screwed to plate 1. As with element 56, the braking or cam surfaces approach the disc 61, from the central apex, at such an angle or angles that roller 91 will be wedged against a cam surface and the disc to prevent rotation thereof in one direction, while allowing free rotation in opposite direction. Tension spring 95 is fastened to stud 85 and to arm 60 and normally holds roller 91 in contact with cam surface 92, thereby locking disc 61 against rotation in clockwise direction (Figure 2).

Solenoid 96, similar to solenoid 86, is attached to plate 1, and its plunger 97 is connected to arm 60 by means of spring 98, considerably stronger or stiffer than spring 95. Since spring 84 normally causes roller 81 to lock disc 61 against rotation in counter-clockwise direction, this disc is locked against rotation in either direction when neither solenoid is energized. Then, energization of solenoid 86 will allow counter-clockwise rotation of disc 61, and energization of solenoid 96 will allow clockwise rotation of the disc. If the self-locking feature, with power off, is not desired, only one solenoid and locking roller need be used. The end of arm 60 may have notch 99 into which locking pawl 100, pivoted to plate 1, may be pressed when it is desired to hold roller 91 in neutral position out of contact with either cam surface 92 or 94.

Stub shaft 121 is fastened in a hole in end plate 1 and has flange or collar 122. Pinion 123 is attached to insulating disc 124 concentric therewith; and metal disc 125 (Figure 1), having integral slip ring 126 concentric with the disc, is attached to the other face of disc 124. Commutator bars 127 are smoothly recessed into the periphery of disc 124 and are welded or otherwise attached to disc 125. The disc 124 and pinion 123 are axially bored so that they will rotate freely on fixed stub shaft 121. Central holes in slip ring 126 and disc 125 are of larger diameter than that of shaft 121, to prevent electrical contact. Brush 128, slidable in insulating block 129 attached to plate 1, is connected, by means of conductor 130, to the positive terminal of bias battery or other bias voltage source 131, the negative terminal of which is connected to the grid of thyratron 132. One end of resistor 133 is also connected to the positive terminal of bias source 131 and the other end of this resistor is connected to negative line 119. Conductor 130 leads to switch contact 227 and thence to bias source 131.

Flexible strip-type brush 134 is attached to insulating block 129 and is in contact with slip ring 126. Brush 134 is connected with positive line 117 by means of conductor 135. Block 129 has arcuate slot 136 concentric with shaft 121, and screws 137 are threaded into holes in plate 1. These screws serve as guides for block 129 which may be swung through limited angles around the axis of shaft 121. The screws may be tightened to clamp the block and brush 128 in any desired position. Brush 134, through its resiliency, will maintain contact with slip ring 126. Therefore, block 129 and brush 128 can be shifted to vary the timing of the contact of this brush with commutator bars 127, the positions of which are dependent upon the position of shaft 22 and attached rotor units.

The meshing of pinion 123 and gear 64 is close, to minimize back-lash. The number of equally spaced commutator bars 127 is related to the ratio of gears 64 and 123 and to the number of steps of the motor in such manner that the commutator assembly 124—127 is rotated from a position of initial contact of a bar 127 with brush 128 to a position in which the next succeeding commutator bar 127 makes initial contact with brush 128 in the same time period as that required for the rotor to rotate through one step. The position of the rotor ploes or teeth relative to the stator poles or teeth, at the moment of initial contact of a bar 127 with brush 128, is determined by the position of brush 128; and this relative position can be varied by slipping block 129 relative to screws 137. In other words, the brush can be adjusted so that the contact with any bar 127 occurs when the rotor teeth overlap the stator teeth by ⅓ tooth width or more or less. This condition is true for all three phases or sections of the motor, but a separate commutator for each phase could be used, if desired. The commutator 124—127 could be placed directly on shaft 22 if desired, in which case the number of bars 127 would be equal to the total number of steps of the motor unless separate commutators are used.

One end of stator winding 55 is connected to positive line 117, and the free end of the connected rotor winding 41 is connected to slip ring 34 and thence to brush 40, which is electrically connected to the anode of thyratron 137 by means of conductor 138. An end of stator winding 55b of the second section or phase is likewise connected to line 117, and the connected rotor winding terminal is connected to slip ring 46 and thence to the anode of thyratron 139 through brush 47 and conductor 140. Similarly, an end of stator winding 55c of the third motor phase or section is connected to positive line 117, and the other end of this winding is connected to the rotor winding 50 through brush 51 and slip ring 35. The other end of this rotor winding is connected to the anode of thyratron 141 through slip ring 36, brush 53, and conductor 142. The other brush connections have been described before.

Condensers 143, 144, and 145 are connected between the anodes of thyratrons 137—139, 139—141, and 137—141, respectively. These condensers serve to extinguish any one of these three thyratrons which is conducting current when any other of the three thyratrons is fired. The negative poles of bias elements 146, 147, and 148 are connected to the grids of respective thyratrons 137, 139, and 141. The positive poles of these elements, which may be batteries, rectified voltage supplies or the like, are connected, respectively, to ends of resistors 149, 150, and 151, the other ends of which are connected to cathode line or conductor 152. The cathodes of these three thyratrons are likewise connected to line 152, as shown. The actual values of the capacitors and resistors will vary according to the type of thyratron used and according to other factors such as whether photocells, contacts, or the like, are used to fire the thyratrons.

The grid and cathode connections of thyratron 132 have been described. The anode of this thyratron is connected to one end of resistor 153, the other end of which is connected to switch 154, which may be closed to connect the resistor to line 152. The anode of thyratron 155 is connected to an end of resistor 156, the other end of which is connected to resistor 153 and a terminal of switch 154. The resistance of element 153 is higher than the resistance of element 156 so that thyratron 132 will pass less current when fired than will thyratron 155 when it is fired. Condenser 157 is connected between the anodes of these two thyratrons to cause either which is fired to extinguish the other which is conducting current. The cathodes of both thyratrons 132 and 155 are connected to negative line 119. Grid bias battery or other voltage source 158 has its negative pole connected to the grid of thyratron 155 and its positive pole connected to an end of secondary winding 159 of transformer T. The other end of this secondary winding is connected to negative line 119.

Primary winding 160 of transformer T is connected through resistor 232 and line 161 to positive line 117, and through line 162 to spring strip brush 163, one end of which is screwed to Bakelite or other insulating plate 164. This brush presses against the adjacent face of brass or other metal disc 165 which is integral with or electrically connected with metal lugs or commutator bars 166 at right angles to the plane of disc 165 and recessed into the periphery of Bakelite or other insulating disc 167. This disc is concentrically and rigidly attached to shaft 168 which is rotatable in a bore through plate 164 and has an attached handle 169 on the opposite side of plate 164. Metal disc 170 is bored so that it can rotate through a limited arc around shaft 168 and is attached to insulating arm 171 which is fastened to metal arm 172. This arm carries contact element 173 which may at times touch contact 174 screwed to insulating plate 164. Spring washer 175 is placed on shaft 168 between disc 170 and collar 176 which may be fastened to shaft 168 by means of a set screw. Rotation of handle 169 and shaft 168 will, therefore, rotate bars 166 and also, through friction, disc 170 and arm 172 will be rotated until the arm strikes stop 177 for one direction of rotation, or until contact 173 strikes contact 174 for the other direction of rotation. The degree of frictional drag can be adjusted by fastening collar 176 at different positions on shaft 168, thereby varying the degree of compression of spring washer 175.

Arm 172 is connected to line 161 and so to line 117 by means of flexible conductor 178. Contact 174 is connected to the positive terminal of bias battery or other voltage source 179, the negative terminal of which is connected to the grid of electronic tube 180. The cathode of this tube is connected to negative line 119. Resistor 181 is connected between the positive terminal of bias source 179 and line 119. The anode of tube 180 is connected to one end of the double throw relay magnetizing winding 182 through conductor 183. The other end of winding 182 is connected to line 117 which is also connected to the contact arm 184 by means of flexible conductor 185. The arm 184 is normally held in contact with contact element 195 by a spring. Contact 195 is connected to a terminal of solenoid 96 by conductor 196 and switch 197. The other terminal of solenoid 96 is connected to negative line 119 by conductor 188 which is also connected to a terminal of solenoid 86 (Figure 2). The other spaced contact 186 of the relay is connected to the remaining terminal of solenoid 86 by means of conductor 187 passing through solenoid winding 217 of gear box 216. Solenoid 96 is, therefore, normally energized through relay contact 195, and roller 91 is accordingly pulled against surface 94 to allow clockwise rotation of disc 61, but not in opposite direction. Spring 84 pulls arm 57, and roller 81 abuts surface 82 likewise to allow only clockwise rotation of disc 61. Then if relay winding 182 is energized, arm 184 will be pulled against contact 186, and so solenoid 86 will be energized, solenoid 96 being de-energized. Under these conditions, spring 95 causes roller 91 to strike surface 92, allowing only counter-clockwise rotation of disc 61, and solenoid 86 causes roller 81 to be pulled against surface 83, also allowing only counter-clockwise rotation of disc 61. The motor shaft 22, of course, rotates in a direction the reverse of the disc rotation. If power is removed from both solenoids, the springs cause the rollers to lock disc 61 against rotation in either direction. If both solenoids are to be used, switch 197 in line 196 is closed, but if it is desired to use only solenoid 86, then switch 197 is opened.

Line 117 is connected to line 152 through limiting resistor 189 so that thyratrons 132 and 155 will at all times have anode potential available, irrespective of thyratrons 137, 139, or 141. Switch 190 is connected between lines 152 and 119 and is open when thyratrons 132 and 155 are in use and switch 154 is closed. If it is desired to cut these two thyratrons out of circuit, switch 154 is opened and switch 190 is closed.

The blades of double pole double throw switch 226a—226 are connected, respectively, to the positive terminal of bias source 131 and to the cathode line 119 of tube 132 and resistor 133. One switch contact 227 is connected to conductor 130 and is arranged to be touched by switch blade 226a. When the switch is closed against contact 227, conductor 130 is connected with the positive terminal of source 131 and with the connected end of resistor 133, the other end of which is connected with line 119. When the switch blades are closed against contacts 228, the positive terminal of source 131 is connected with one terminal of secondary winding 234 of transformer T₂, and the other terminal of winding 234 is connected with line 119. The terminals of primary winding 235 of transformer T₂ are connected, respectively, with a terminal of neon or other gaseous lamp 229 and to the junction of condenser 230 and a terminal of primary winding 160 of transformer T, the other terminal of which is connected with brush 163 by conductor 162. The remaining terminal of tube 229 is connected to one end of variable resistor 231, the other terminal of which is connected to positive line 117 by means of conductor 161. Resistor 232 may be connected as shown.

Switch 233 is connected between line 135 and conductor 130 so that, by closing switch 233, the commutating or switching action of commutator 127 can be by-passed when desired. It will be seen that by opening switch 233 and closing the blade of switch 226a against contact 227, the commutator 127 will be in circuit with thyratron 132. If, however, switch 233 is opened and the blades of switch 226 are closed against contacts 228, commutator 127 will be effectively out of circuit, and the time delay circuit comprising the elements 229, 230, 231, and 232 will be in circuit with thyratron 132.

Brushes 191, 192, and 193 are slidably mounted in slots in insulating block 194 which is screwed to plate 164, and are connected, respectively, with the positive terminals of bias sources 146, 147, and 148. These brushes are spaced so that any one of the commutator bars 166 will, when handle 169 is turned, strike the brushes in succession, preferably after equal angular displacements of the commutator, and then a similar angular displacement will bring the next succeeding commutator bar into contact with the first brush to be struck. This is true for either direction of rotation of the commutator. When a commutator bar is brought into contact with a brush, current from line 117 is directed through the connected resistor 149, 150, or 151 so that the positive voltage developed across the resistor is sufficient to overcome the negative bias voltage, and accordingly the associated thyratron is fired. The bias voltages will vary according to conditions but, in practice, using 105 type thyratrons, I have found that 90 to 100 volts negative bias provides good quenching action when a fired thyratron extinguishes another. The line voltage between conductors 117 and 119 may vary from, say, 200 volts or less up to many hundreds of volts, according to conditions. The capacitance of condensers 143, 144, or 145 will vary from 20 to 50 M. F. each, depending upon loads, voltages, and other factors.

Arm 172 has reduced end portion 172a which, through the resiliency of the arm, is forced againust cam 177a which is fastened to plate 164 and has its apex positioned so that arm 172 will be urged clockwise by the cam to force contact 173 against contact 174 in the position shown. For this condition, shaft 168 (Figure 1) will have been turned clockwise, and the friction between disc 170 and plate 165 will force end element 172a over the apex of the cam. When shaft 168 is rotated in the reverse direction, the friction causes end element 172a to be pushed over the cam apex, and the other edge of the cam will force arm 172 against stop 177 so that the circuit including contacts 173 and 174 is broken and is maintained open until the direction of rotation of shaft 168 is reversed.

Figure 6:
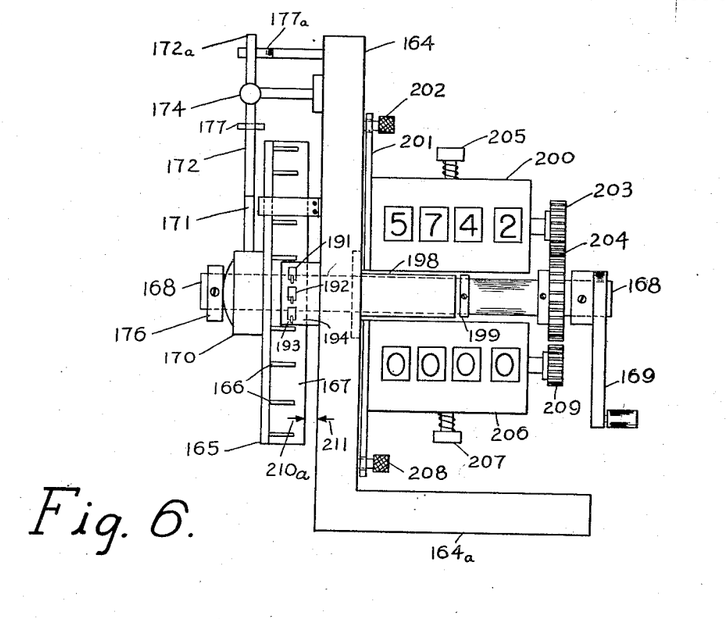
Figure 6 is an edge view of a three-phase commutator device with associated selsyn motor switch.

As shown in Figure 6, the insulating plate 164 has foot 164a which may be held or attached to a support. Elongated flanged bearing 198 is attached to plate 164 and serves to support shaft 168 for rotation, collar 199 being provided to prevent axial movement of the shaft to the left. Counter 200 has tail 201 which is pivoted to plate 164 by means of thumbscrew 202. The shaft of this counter has attached gear 203 which may be meshed with gear 204 attached to shaft 168, by swinging the counter about pivot 202 and then tightening this thumbscrew to hold the gears in mesh. Clearing button 205 on the counter may be pressed or rotated to bring the numeral wheels of the counter back to zero position. Similar counter 206, having clearing button 207, is pivoted to plate 164 by thumbscrew 208, so that this counter may be swung about pivot 208 to bring its shaft-attached gear 209 into mesh with gear 204, and these gears may be held in mesh by tightening thumbscrew 208. Counter 200 is arranged to increase its numeral indications when handle 169 is turned clockwise as viewed from the right, and counter 206 is arranged to increase its numeral indications when handle 169 is turned in opposite directions. These counters may be of known construction and need not be described in detail. Either counter, or both, may be driven simultaneously by gear 204. If desired, a linkage can be arranged between them so that one counter is brought out of mesh when the other is brought into mesh. Further, gears 203, 204, and 209 may remain in mesh and suitable easily operated clutches or the like can be employed to cause the driving of one or both counters.

In operation, positive line 117 is connected to the positive terminal of a direct current generator or other source of direct current, and line 119 is connected to the negative terminal of the direct current source. The cathodes of the thyratrons, shown schematically in Figure 1, may be energized by current from a direct current source, but it is convenient to heat these cathodes by alternating current from step-down transformers, the cathode voltage and current depending upon the type of tube used.

First, consider that switch 154 is open and switch 190 is closed and that the thyratrons have been heated sufficiently to come up to operating temperature. Then if handle 169 is turned counterclockwise as seen in Figure 1, the commutator bars 166 will be brought into contact with brushes 193, 192, and 191 in that order, with the result that current from line 117 and conductor 161 will pass through elements 232 and 160, brush 163, bars 166, brushes 193, 192, and 191, and thence through resistors 151, 150, and 149, and through switch 190 and so back to negative line 119. When this current, of greater voltage than that of the bias sources 148, 147, and 146, is applied to the resistors, the grids of thyratrons 141, 139, and 137 are made positive momentarily so that these thyratrons are fired in the order indicated. By means of quenching condensers 144, 143, and 145, any thyratron conducting current is extinguished when any other one of the three is fired. If the rotor teeth 31—32 are initially overlapping the associated stator teeth 15—16 by one-third circumferential tooth width, then these rotor teeth will be magnetically snapped into register or alignment with the stator teeth when thyratron 141 is fired or energized, the current passing through stator windings 55c, brush 51, slip ring 35, rotor winding 50, slip ring 36, and out brush 53 and conductor 142 to the anode of thyratron 141, and then through the thyratron to negative line 119. The windings 55c provide magnetic flux in the stator and rotor as indicated by the arrows, the rotor winding aiding in the establishment of this flux. This spool-type rotor construction provides a short magnetic path and high magnetizing force for a given current. In addition, the coil 50 is simple to wind. Either this winding or the stator windings could be eliminated, but for maximum power with minimum current, it is desirable to use both windings.

Now, when rotor teeth 31—32 are snapped into alignment, the rotor teeth 29—30 of the next motor section or phase are brought into a position of overlapping the associated stator teeth 13—14 by one-third tooth width. Then, as the commutator bar 166 which previously struck brush 193 leaves that brush and comes into contact with brush 192, thyratron 139 is fired and thyratron 141 is extinguished. When current suddenly passes through thyratron 139, the line 117 is connected to line 119 through stator windings 55b and rotor winding 49 of the second section or phase, the connection being completed through brush 43, slip rings 44 and 46, brush 47, and conductor 140 leading to the anode of thyratron 139. The energization of this section causes rotor teeth 29—30 to snap into alignment with stator teeth 13—14 and the rotor teeth 27—28 of the next phase or section are rotated to a position overlapping the associated stator teeth 10—11 by one-third tooth width. Then, the same commutator bar 166 strikes brush 191 so that thyratron 137 is fired and thyratron 139 is extinguished, the current passing from line 117 through stator windings 55, brush 38, slip ring 33, rotor winding 41, slip ring 34, brush 40, through conductor 138 to the anode of the thyratron 137, and thence through the thyratron, then through conductor 152 and switch 190 to negative line 119. The current from the cathodes of the thyratrons 139 and 141 likewise travels through conductor 152 and switch 190 to line 119. The energization of windings 55 and 41 causes rotor teeth 27—28 to snap into alignment with stator teeth 10—11, thereby bringing rotor teeth 31—32 to a position overlapping the stator teeth 15—16 by one-third tooth width. When the next succeeding commutator bar 166 comes into contact with brush 193, thyratron 141 is again fired and rotor teeth 31—32 are magnetically snapped into alignment with stator teeth 15—16, the thyratron 137 being extinguished through the agency of condenser 145. Then the operation is repeated as described, as each commutator bar sweeps under the brushes.

It will be seen that the successive energization of the three phases of the motor will cause the rotor to revolve in steps, one step movement of the rotor being two-thirds tooth width at the rotor circumference. The initial overlap of the rotor teeth will vary somewhat with load and the intensity of magnetization, but the rotor will revolve even though the initial rotor tooth overlap varies considerably. It is assumed in the above discussion that switch 219 in line 116 is open and that motor 108 is not energized.

Since any thyratron discussed continuous to conduct current until the next succeeding one is fired, it is obvious that the rotor is always under control of a magnetic field, and therefore does not over-travel or "free wheel." This is a very desirable feature, since in various servo-systems and other applications it is quite important to be able to provide definite motor displacements. In this case, the displacements can be controlled accurately within a fraction of a tooth width and, by means of suitable gearing, any desired accuracy of control can be obtained.

If thyratrons are not used and the commutator distributes current directly to the windings of the motor, the width and spacing of commutator bars 166 and that of the brushes can be so chosen that one section of the motor will be held magnetized until the next succeeding section is magnetized, thereby eliminating "floating" of the rotor.

If handle 169 and commutator bars 166 are rotated in reverse direction, or clockwise as seen in Figure 1, then the commutator bars 166 will strike the brushes in the order 191, 192, and 193, and the thyratrons will be fired in the order 137, 139, and 141, and the order of energization of the motor will be reversed from that previously described, resulting in reverse rotation of the rotor, in steps. Regardless of the direction of rotation of the rotor, it moves one step each time a commutator bar 166 comes into contact with one of the brushes 191, 192, or 193, and the rate of rotation of the rotor and its direction are determined by the rate of rotation of the commutator and by its direction of rotation.

If it is desired to count the number of commutator contacts with the brushes, i. e. the number of step movements of the rotor, then thumbscrew 202 (Figure 6) is loosened and gear 203 is swung into mesh with gear 204, a mark 210a on the commutator being initially set with respect to a fixed mark 211 on plate 164. Thumbscrew 202 may be tightened to hold the gears in mesh and as handle 169 is turned in, say, forward direction, counter 200 will register the number of steps through which the rotor revolves. If the handle is rotated in reverse direction, the counter will deduct the number of steps which the rotor moves in reverse direction so that the final reading of the counter will indicate the net difference of the number of steps forward and reverse. If it is desired to count directly the number of steps in reverse direction, gear 209 may be brought into mesh with gear 204, and the reverse steps will be indicated on counter 206. Both of these counters could, of course, be housed in the same casing.

Further, a counter 212 (Figure 2) may be fastened to plate 1 of the motor with its drive gear 213 meshed with gear 64 on the motor shaft so that the step movements of the motor shaft will be indicated. In this way, the actual movements of the shaft are shown so that there will be no error of indication in case a thyratron were to miss firing for one or more steps. Counter 212 is shown as a double type which can register step movements in either or both directions, and either set of numeral wheels can be cleared at any time by pushing one or both buttons 214 or 215.

If it is desired to increase the speed of the motor or the starting torque for each step, switches 233 and 199 are opened and switch 154 is closed. Then screws 137 (Figure 2) are loosened and block 129 is guided by arcuate slot 136 until attached pointer 129a is at a chosen position with reference to scale 130a which indicates the relative position of brush 128 and the stator teeth at the moments of contact of commutator bars 127 with brush 128. Since the number of these contacts per revolution of the rotor is equal to the total number of steps of the motor, the brush 128 can be adjusted so that it will make contact with a commutator bar, regardless of phase, at the moment of one-third rotor tooth overlap or at other fractional tooth overlap, as desired. As stated before, the actual rotor tooth overlap, with respect to the stator, will vary according to load and other factors. The position of brush 128 may likewise be set so that the motor shows maximum speed or maximum torque. The widths of bars 127 and brush 128 may be chosen so that the brush contact will occur at the same relative rotor tooth overlap of the stator teeth, for either direction of rotation of the rotor, or the brush can be shifted for a change of direction of rotation. A separate brush and commutator may be used for each phase, if desired.

Resistor 153 is chosen of such value that a normal or running current traverses the motor windings when thyratron 132 is fired and any one of the three thyratrons 137, 139, or 141 is concurrently fired. The resistance of variable resistor 156 is less than that of resistor 153 so that a current of increased magnitude will be passed through the motor windings when thyratron 155 is fired. This thyratron is fired at the moment of contact of any commutator bar 166 with any of the brushes 191, 192, or 193, since the commutator current passes through primary winding 160 of transformer T and induces a pulse in secondary winding 159 which is phased to apply a positive pulse to the grid of thyratron 155 sufficient to overcome the negative bias and so to fire it. Therefore, tube 155 is fired at the beginning of each step movement of the rotor, the firing period of thyratrons varying usually from 10 to 100 microseconds. Likewise, the de-ionization time of usual types of thyratrons varies from 100 to 1,000 microseconds. When tube 155 is fired, tube 132 is extinguished, by means of condenser 157 and associated resistors 153 and 156. Resistor 153 can be variable and resistor 156 can be adjusted to pass more or less starting current, as desired. Resistor 156 could be linked to a load or speed indicator or governor so that it will be automatically varied according to load or speed of the motor.

Brush 128 may be set so that current from line 117, line 135, brush 134, slip ring 126, and any commutator bar 127 will pass through brush 128, conductor 130, and resistor 133 to apply positive bias to the grid of thyratron 132 to fire it when the rotor teeth overlap the stator teeth by any desired amount. Switch 227—226a will, of course, be closed under these conditions. When tube 132 is fired, tube 155 is automatically extinguished and, due to higher resistance of element 153, the current through the motor field and rotor windings is reduced to a lower value. This is done since less current is required to keep the rotor moving than is required to accelerate it from a stationary or slower speed condition. The reduction of current for each step of rotor rotation will, therefore, reduce the power required as well as reduce heating effects. By setting brush 128, the high starting current can be automatically reduced at any desired fractional part of a step. In other words, the higher current can be maintained for 10%, 30%, 50% or any desired proportion of the step movements.

It would be difficult to time the firing of thyratron 132 with each of the thyratrons 137, 139, or 141, so that simultaneous firing would occur. For that reason, positive line 117 is connected to conductor 152 through resistor 189 which should have a sufficiently high resistance to limit the current and to provide enough potential drop across the motor windings and connected thyratrons. The resistance of element 189 can be fairly high, allowing passage of just sufficient current to cause firing of thyratron 132 or thyratron 155, when biased positively. The principal current through these thyratrons passes through the thyratrons 137, 139, and 141 in sequence.

If it is desired to use the electrical time delay circuit for firing thyratron 132, instead of commutator 127, switches 233 and 154 are closed and switch 190 is opened, and the blades of switch 226—226a are brought into connection with contacts 228. Then, when the commutator or distributor bars 166 are rotated, thereby periodically passing current through lines 161 and 162, resistor 232, and primary 160, thyratron 155 is first fired to provide a heavy starting current per step and the potential drop across resistor 232 charges condenser 230 through resistor 231 until the potential across the condenser rises to the breakdown potential of the gas in tube 229, at which time condenser 230 is suddenly discharged through primary winding 235, which is phased to provide a positive pulse across resistor 133 of greater voltage than the negative voltage of bias source 131. Thyratron 132 is, therefore, fired when tube 229 suddenly breaks down and the time delay between the firing of thyratron 155, with heavy current, and the subsequent firing of thyratron 132 which passes less current, can be controlled by adjusting variable resistor 231, or variable condenser 230, or both. This type of current modulator is not governed by the relative position of the rotor and stator.

When it is desired to use the booster effect of motor 108, this is connected in circuit with lines 117 and 119 by closing switch 216 so that the motor revolves approximately at rated speed. Then, assuming that the shaft 22 is being rotated in steps, switch 210 is closed and thumbscrew 76 is adjusted until commutator bars 66 make contact with triangular brush 72 (Figure 3) approximately at the moments that the thyratrons 137, 139, and 141 are fired, or slightly before, in order to allow for any effects of time lag of magnetization of clutch 101—115 or other components. When a bar 66 comes into contact with brush 72, the circuit carrying current through clutch-magnetizing winding 114 is completed from line 117, through switch 210, brush 111, slip ring 113, winding 114, slip ring 112, brush 110, flexible wire 120, brush 72, commutator bar 66, slip ring 68, brush 78, and through conductor 118 to negative line 119. When winding 114 is energized, magnetic flux is caused to pass through the oil-iron particle mixture between the inner face of magnetizable housing element 101 and magnetizable disc 115 attached to shaft 106 of motor 108. The magnetic field passes through a portion of this shaft and through magnetizable housing element 104. Upon establishment of the magnetic field, the iron particles are aligned and, in effect, tightly bind together disc 115 and element 101 so that motor 108 assists in driving shaft 22. This power boost for shaft 22 will serve to help accelerate shaft 22 from a zero starting speed, or from a relatively slow starting speed, and the power boost will continue until the bar 66 leaves brush 72, thereby breaking the circuit to winding 114. The magnetic field of the clutch then quickly collapses and the rotating disc 115 is effectively disengaged from element 101 so that shaft 22 is no longer accelerated or driven by motor 108.

The period of time during which winding 114 is energized may be controlled by adjusting thumbscrew 74. If this is turned to lift brush 72, then, due to its tapered shape, the ends of the bars 66 remain in contact with the adjacent face of brush 72 for less and less periods of time as the brush is lifted. If thumbscrew 74 is turned in a direction to lower brush 72, then the periods of time of contact of the brush and the commutator bars will be increased. Therefore, by adjusting thumbscrew 74, the winding 114 may be energized for a small or large fraction of the step movements of the rotor. Brush 72 may be of resilient character so that it will be pressed against the ends of commutator bars 66, or a spring may be used for that purpose. The shape of brush 72 and the cross-sectional shape of bars 66 can be chosen so that the winding 114 will be properly energized for either direction of rotation of shaft 22; or thumbscrew 76 can be adjusted so that block 69 and brush 72 are swung about guide screws 71, against the tension of spring 77, until the rotating commutator bars 66 make contact with the brush at the proper times. Motor 108 can be reversed for reverse rotation of shaft 22 or a suitable reversing gear or other mechanism 216 can join the sections of shaft 106. Solenoid 217 is connected in series with line or conductor 187 and is energized when reversing relay 182 is energized. Solenoid 217, when energized, shifts gears, or operates a reversing clutch or other mechanism to cause the direction of rotation of shaft 106 to reverse even though motor 108 continues to revolve in the same direction. Such reversing mechanisms are known.

The speed of rotation of shaft 106 can be chosen for optimum accelerative or power boosting effect, as desired. The speed may be equal to or greater than the maximum speed of the step motor rotor. If the step motor is operated in such manner that the rotor comes to rest at the end of each step, then a greater accelerative boost at the beginnings of step movements will be more appropriate for maximum step motor speed than if the rotor is merely slowed during each step. In some cases, the speed of shaft 106 could be less than the maximum speed of the rotor shaft 22. For very close step control, requiring the stopping of the rotor within one step movement, it is important not to continue the boosting effect from motor 108 long enough, during any step, to lose step control or to cause the step motor to overtravel.

The step motor is phased so that the rotor turns in counter-clockwise direction as viewed in Figure 2 when handle 169 is turned in counter-clockwise direction as seen in Figure 1, since contact 173 is separated from contact 174, due to frictional drag on disc 170, and solenoid 96, only, is energized. Under these conditions, rollers 81 and 91 allow disc 61 to rotate in clockwise direction (Figure 2), but lock this disc tightly against rotation in the reverse direction. This, of course, allows shaft 22 and attached rotor units to rotate in counter-clockwise direction, but the rotor, through gears 64 and 62 and associated mechanism, is prevented from rotating in clockwise direction. This automatic locking feature, which prevents back-swing of the rotor at any fractional position of a step displacement, is very important since it makes possible a smooth working and reliable motor operation which, otherwise, would be very uncertain.

I have found that, without the automatic brake, the rotor oscillates, hunts, and otherwise behaves very erratically. The cause of this is that it is a resilient system. When the teeth of any rotor section are magnetically snapped into alignment with the teeth of the associated stator section, the rotor does not stop in the aligned or in-register position, but, due to the momentum of the rotor, continues beyond that position, being decelerated by the back magnetic pull until the rotor comes to rest at the end of the step movement. Now, if the magnetization of the next phase or section occurs at the moment of rotor stoppage, or slightly before, the teeth of the next rotor section will be magnetically snapped forward and if the magnetization of all three phases is timed in this manner, the motor will operate satisfactorily. If, however, the timing of the sequential energization of the phase windings is not synchronized with the zero-speed positions of the rotor, or approximately so, then the next succeeding phase may be magnetized while the rotor is rapidly moving backward as a result of reverse magnetic pull, and the reverse momentum may virtually cancel the forward acceleration so that there is little net accelerating torque. The rotor, therefore, tends to oscillate about the aligned position, but sometimes is more or less neutralized by opposed magnetic pull and, at other times, is accelerated additionally while rapidly moving forward. The result is that no consistent rotation occurs and little power is obtainable.

The use of the locking rollers, allowing one-way rotation only, radically changes the operation of the motor, making possible continued rotation virtually without backswing or oscillation. An important aspect of this construction is that the rotor is stopped in its most forward position while it is stationary and so there is little or no shock. The actual amount of over-swing of the rotor teeth with respect to the associated stator teeth will depend upon the load, the magnetic field, momentum, and other factors, but the brake or locking arrangement is designed so that rotor backswing is prevented, regardless of the fractional step position of the active rotor teeth with respect to its associated stator teeth. By this construction, I have found that the step operation of the motor can be made to be smooth and reliable, practically without hunting or oscillations. Beyond a certain speed, the step displacements are hardly noticeable. The same conditions apply for opposite rotation of the rotor, the brake, of course, being properly set.

If handle 169 is turned in clockwise direction, as seen in Figure 1, the frictional drag will cause arm tip 172a to be quickly forced over cam 177a, and contact 173 will be snapped against contact 174, thereby applying positive bias to the grid of tube 180 which then passes sufficient current through the winding 182 to cause relay contact arm 184 to be magnetically pulled down against contact 186. This breaks the circuit to solenoid 96 and closes the circuit energizing solenoid 86 so that rollers 81 and 91 are set to allow counter-clockwise rotation of disc 61, but not rotation in the opposite direction. This, of course, allows rotation of the rotor and attached shaft 22 in clockwise direction, but not in opposite direction. The length of arm 172 is made sufficient so that contacts 173 and 174 will either be brought together, or separated, depending upon the direction of rotation of handle 169, before the next succeeding commutator bar 166 comes into contact with one of the brushes 191, 192, or 193. A stepped-up gear system can be used. The reverse rotation of handle 169 and commutator 166—167 will reverse the order of firing of thyratrons 137, 139, and 141 so that the step motor will rotate in opposite direction.

A desirable feature of the brake system is the step-up gear ratio between gear 62 on disc 61 and gear 64 fastened to shaft 22. This results in small angular movements of shaft 22 being in effect amplified so that the periphery of disc 61 will, for any step movement of the rotor, be displaced through a considerably greater arcuate movement than the corresponding arcuate peripheral displacement of the rotor. Therefore, the rotor can be locked against even small fractional step backswings so that more efficient operation results. Another advantage is that the amplifying arrangement proportionally reduces the locking force required at the periphery of disc 61, and less bulky and rugged construction can be used. More than two rollers can be used if desired, and, as stated previously, only one roller can be used. In that case, solenoid 96 would not be necessary. In some applications, however, it is desirable to have the rotor automatically locked by the springs and rollers when neither solenoid is energized.

The motor shaft may be connected with a load by means of gearing, a pulley, or otherwise. Various features described in this motor may be used separately or in conjunction in order to improve the operation of the motor, as indicated. While the use of thyratrons is described, it is obvious that if the commutator 166—167 is of heavy enough construction, the thyratrons can be eliminated and the commutator can be used to distribute current directly to the motor windings. The commutator may be as shown or it can comprise microswitches or other switches or relays. The commutator may also be in the form of a belt or tape which may be suitably driven and which may be marked, printed, punched, or equipped with capacitive, conductive, or magnetic areas in order to modulate or distribute currents to the motor phases, as described in my co-pending applications, Serial No. 295,694 filed June 20, 1952, and Serial No. 373,187, filed August 10, 1953.

Figure 4:
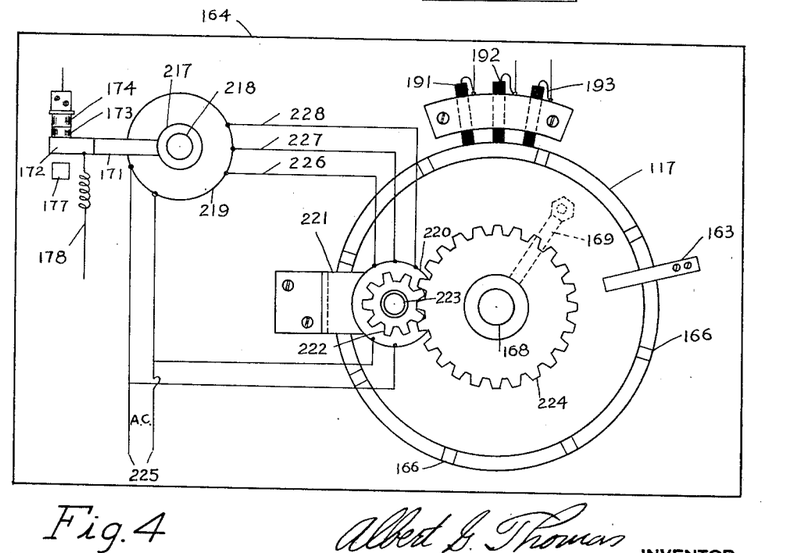
Figure 4 is a front view of a three-phase commutator device with associated selsyn motor switch.

In Figure 4, like parts are designated by like numerals as in Figure 1. In this case, contact arm 171—172 is attached to collar 217 which is rigidly fastened to shaft 218 of selsyn motor 219 which is fastened to plate 164. Similar selsyn motor 220 is fastened to bracket 221 which is screwed to plate 164. Pinion 222 is fastened to shaft 223 of motor 220 and is meshed with larger gear 224 which is fastened to shaft 168 by means of a set screw through the gear hub. Alternating current line 225 is connected with both selsyn motors, and the three phases of these motors are connected by means of conductors 226, 227, and 228 in known manner. Therefore, when handle 169 is turned in one direction, gear 224 will rotate pinion 222 and selsyn shaft 223 relatively rapidly, and the shaft 218 of connected selsyn motor 219 will be urged in a direction to bring contact 173 against contact 174, thereby energizing the reversing solenoid as previously described.

The selsyn motors can be small so that the torque urging arm 171—172 to close the contacts is only enough to serve the purpose and will not act as a strong brake against turning shaft 168 when the shaft 218 is stopped. When handle 169 is turned in opposite direction, the torque on shaft 218 is reversed in direction and contact arm 172 is quickly brought back against stop 177, thereby separating contacts 173 and 174 for forward rotation of the step motor. Motors 219 and 220 could be replaced by small step motors, if desired. The step-up gear ratio between gears 222 and 224 causes the contact arm 171—172 to operate even for small angular movements of shaft 168. By means of this construction, the frictional drive for arm 171—172, as illustrated in Figure 1, may be eliminated.

Figure 5:
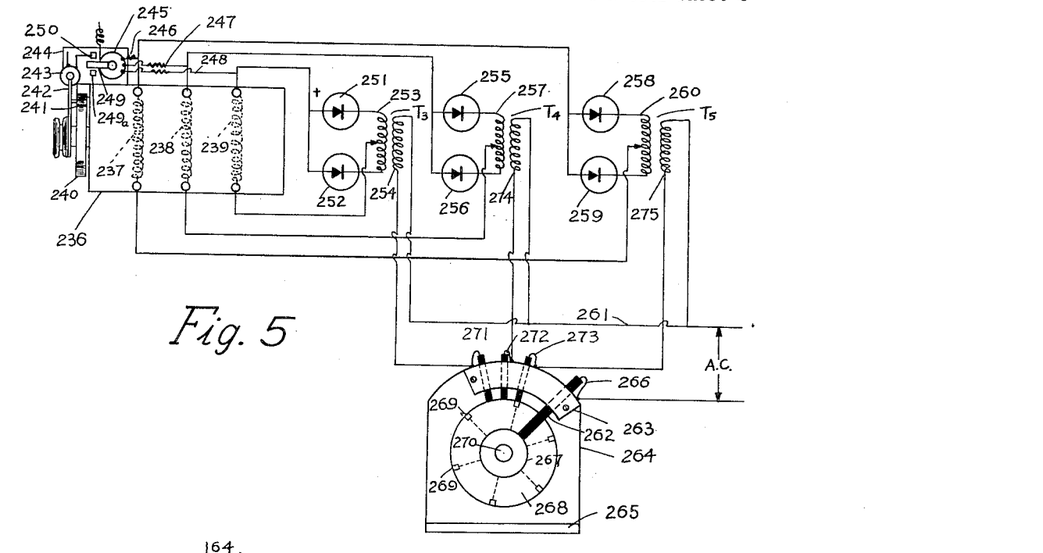
Figure 5 is a schematic circuit diagram showing a step motor operated by direct current provided by rectifiers which are supplied by alternating current controlled by a commutator.

In Figure 5, step motor 236 is generally similar to the step motor shown in Figure 1 and has three windings 237, 238, and 239 for magnetizing the respective phases. Disc 240 on the shaft cooperates with roller 241 which can be adjusted by means of bar 242 to lock the disc and motor shaft against rotation in either direction, allowing rotation in opposite direction, as previously described. Solenoid 243 can be energized to move arm 242 and the roller in one direction and a suitable spring moves the arm and roller in opposite direction. The solenoid is mounted on plate 244 attached to the motor, and small selsyn motor 245 is likewise mounted on this plate. The three-phase windings of this motor are connected to the windings of motor 236 by means of conductors 246, 247, and 248 and resistors, and the A. C. winding of motor 245 is preferably short circuited to provide more power.

Relay arm 249 is attached to the shaft of motor 245 and is urged against a stop 249a in one direction, and against contact 250 in the opposite direction to close a circuit energizing solenoid 243 which sets roller 241 for reverse rotation of motor 236. The shaft of selsyn motor 245 is urged in opposite direction when the order of energization of windings 237, 238, and 239 is reversed.

The cathodes of rectifiers 251 and 252 are connected together and to one end of winding 239. The other end of this winding is connected to the center tap of secondary winding 253 of transformer T3, the primary winding 254 of which is connected to alternating current line 261 and to brush 271. The ends of winding 253 are connected to the anodes of rectifiers 251 and 252 which may be of mercury vapor type or of dry disc construction. Rectifiers 255 and 256 are similarly connected to secondary winding 257 of transformer T4 and to motor winding 238. Likewise, similar rectifiers 258 and 259 are connected in similar manner to third motor winding 237 and to secondary winding 260 of transformer T5. One end of each of the primary windings 254, 274, and 275 of respective transformers T3, T4, and T5 is connected to A. C. line 261; and the other ends of these windings are connected, respectively, with brushes 271, 272, and 273. Brush 262 is slidable in a slot in Bakelite or other insulating segment 263 fastened to a plate 264 having foot 265. Spring 266 serves to press brush 262 against slip ring 267 which is mounted on insulating disc 268 coaxially therewith. Commutator bars 269 are mounted in the periphery of disc 268 and are electrically connected with slip ring 267. The commutator assembly is mounted on shaft 270 which is rotatable in a bearing in plate 264 and which may be equipped with a handle for turning. Spring-pressed brushes 271, 272, and 273 are slidable in slots in element 263 and are electrically connected, as described.

In operation, when commutator 268—269 is rotated in clockwise direction, the commutator bars 269 strike the brushes in the order 271, 272, and 273, and the alternating current passing through line 261 and brush 262 is supplied to the primaries of the transformers in the order T3, T4, and T5 which results in full-wave rectified direct current being supplied to the motor windings in the order 239, 238, and 237. If the motor is phased so that this is the normal or forward direction of rotation, then the intermittent phased energy supplied to selsyn motor 245 will cause it to urge arm 249 against stop 249a. When, however, commutator 268—269 is rotated in counter-clockwise direction, the commutator bars 269 will come into contact with the brushes in the order 273, 272, and 271, and the primaries of the transformers will be energized in the order T5, T4, and T3, with the result that the motor windings will be supplied direct current in the order 237, 238, and 239, causing reverse rotation of motor 236. The reversed phasing of the currents supplied to selsyn motor 245 will cause this small low intertia motor quickly to swing arm 249 against contact 250, thereby energizing solenoid 243 for reverse rotation of the step motor. A snap-action relay or switch can be used for this solenoid control switch in order to prevent chatter. Likewise, a gear system can be used to move arm 249 through a relatively large angle when the shaft of motor 245 moves through a small angle.

This A. C.-D. C. system has the advantage that alternating current circuits are handled by the commutator, thereby reducing arcing troubles, but direct current is supplied to the motor windings, which provides considerably more power than would alternating current. Suitable filters can be used with the rectifiers, if desired.

While I have described a number of features of the invention, it is apparent that modifications of details can easily be made without departing from the principles I have disclosed.

What I claim is:

1. In a motor having stator means, and having rotor means adapted to be rotated in steps, means for energizing said motor to cause step movements of said rotor, and means for increasing the energization of said motor substantially at the beginnings of said step movements.

2. In a motor having stator means, and having rotor means adapted to be rotated in steps, means for energizing said motor to cause step movements of said rotor, means for increasing the energization of said motor substantially at the beginnings of said step movements, and means for reducing the energization of said motor before the ends of said step movements.

3. In an electromagnetic device including stator means and rotor means, one of which means has a plurality of groups of positionally phased poles and the other of which means has poles associated with the other said poles, means for magnetizing said groups of poles in predetermined order, and means for causing relatively strong initial magnetization of said groups of poles and for causing weaker magnetization thereof before magnetization of the next succeeding group of poles to be magnetized.

4. In an electromagnetic device including stator means and rotor means, one of which means has a plurality of groups of positionally phased poles and the other of which means has poles associated with the other said poles, means for magnetizing said groups of poles in predetermined order, means including switch means for causing relatively strong initial magnetization of said groups of poles, and means including timing means for causing reduction of the degree of said magnetization before the magnetization of the next succeeding group of poles.

5. In an electromagnetic device including stator means and rotor means, one of which means has a plurality of groups of positionally phased poles and the other of which means has poles associated therewith, rotatable braking means driven by said rotor means, means for biasing said braking means substantially to lock said braking and rotor means against rotation in one direction and allowing rotation thereof in opposite direction, means including electromagnetic means for reversing the direction of said biasing, winding means for magnetizing said groups of poles sequentially, distributor means to cause energization of said winding means in predetermined order, and means controlling said electromagnetic means according to the order of energization of said winding means.

6. The device of claim 5, said distributor means including rotatable commutator means, and said controlling means including a switch member frictionally driven by said commutator means.

7. The device of claim 5, said distributor means including rotatable commutator means, said controlling means including relay means, and a self-synchronous motor connected with said distributor means.

References Cited in the file of this patent

UNITED STATES PATENTS

| | | |
|---|---|---|
| 431,649 | Currie | July 8, 1890 |
| 1,408,758 | Meyer | Mar. 7, 1922 |
| 1,440,729 | French | Jan. 2, 1923 |
| 1,753,331 | Clokey | Apr. 8, 1930 |
| 1,818,330 | Horni | Aug. 11, 1931 |
| 1,846,687 | Mentor | Feb. 23, 1932 |
| 1,873,965 | Kern | Aug. 30, 1932 |
| 1,977,745 | Thompson | Oct. 23, 1934 |
| 2,243,063 | Arey | May 27, 1941 |
| 2,313,466 | Dicke | Mar. 9, 1943 |
| 2,449,020 | Spraragen | Sept. 7, 1948 |
| 2,507,798 | Maxwell | May 16, 1950 |
| 2,578,648 | Thomas | Dec. 11, 1951 |
| 2,595,749 | Arnot | May 6, 1952 |

FOREIGN PATENTS

| | | |
|---|---|---|
| 681,400 | Great Britain | Oct. 22, 1952 |